Feb. 4, 1941. O. F. JAGER 2,230,801
HITCH
Filed June 2, 1939 2 Sheets-Sheet 1

INVENTOR.
Otto F. Jager
BY M. Talbert Dick
ATTORNEY.

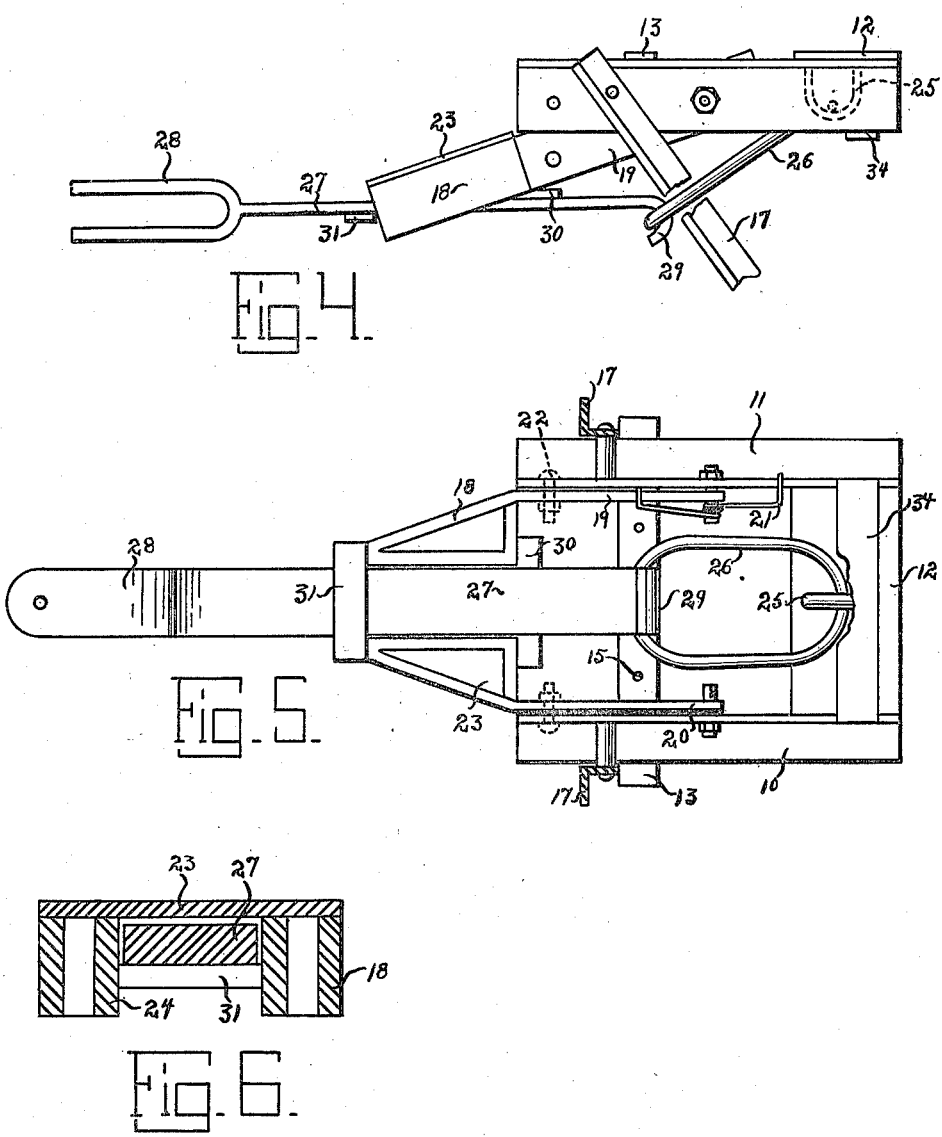

Patented Feb. 4, 1941

2,230,801

UNITED STATES PATENT OFFICE 2,230,801

HITCH

Otto F. Jager, Hartley, Iowa

Application June 2, 1939, Serial No. 276,942

6 Claims. (Cl. 280—33.44)

The principal object of my invention is to provide a hitch that is highly flexible in all directions at the time of connecting two vehicles together or at the time of disconnecting the two vehicles from each other.

A further object of my invention is to provide an easily operated hitch particularly designed for use with tractors and farm implements pulled by such tractors.

A still further object of my invention is to provide a hitch mechanism for the connecting of a drawing vehicle with a drawn vehicle that is capable of supporting the forward end portion of the drawn vehicle at times when the two vehicles are being secured together or detached from each other.

A still further object of this invention is to provide a hitch mechanism that will automatically become highly loose and flexible when it is desired to detach the pulled vehicle from the pulling vehicle.

A still further object of my invention is to provide a hitch which will permit a tractor or like to be coupled to a trailing vehicle such as a farm implement when the tongue of the trailing vehicle is supported a substantial distance above the plane of the draw bar of the tractor or like.

A still further object of this invention is to provide a hitch which makes possible the coupling and uncoupling of a tractor or like to or from a farm implement without the necessity of the driver of the tractor or other vehicle leaving his position at the controls of the vehicle.

A still further object of my invention is to provide a hitch that is economical in manufacture, durable and efficient in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 4 is a side elevational view of my hitch in one of its intermediary positions.

Fig. 5 is a bottom elevational view of my complete hitch more fully illustrating the structure.

Fig. 6 is a cross sectional view of the arm and arm retaining frame of my hitch and is taken on the approximate line 6—6 of Fig. 2.

Figure 1:
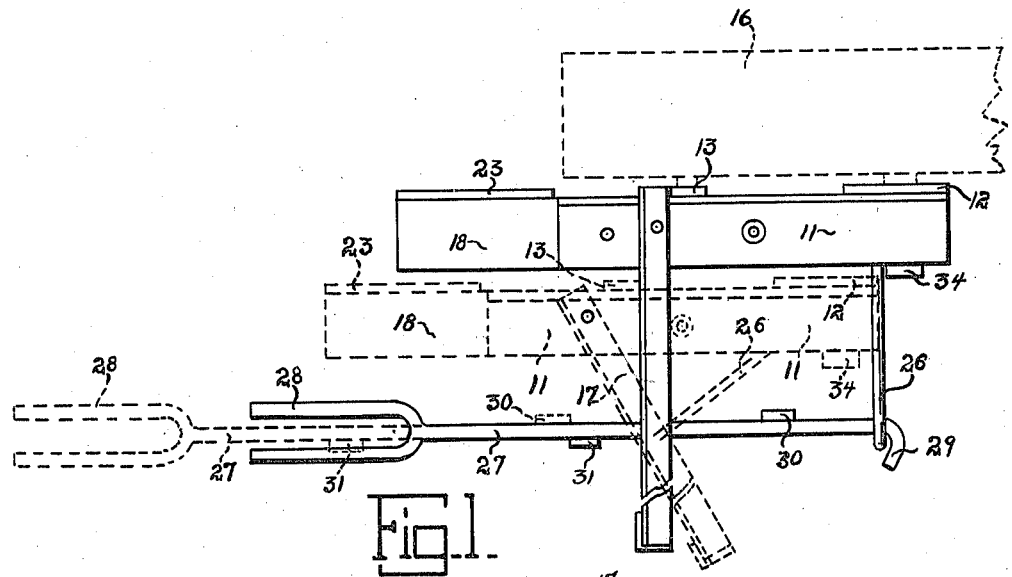
Fig. 1 is a side elevational view of my complete hitch ready for use.
Figure 2:
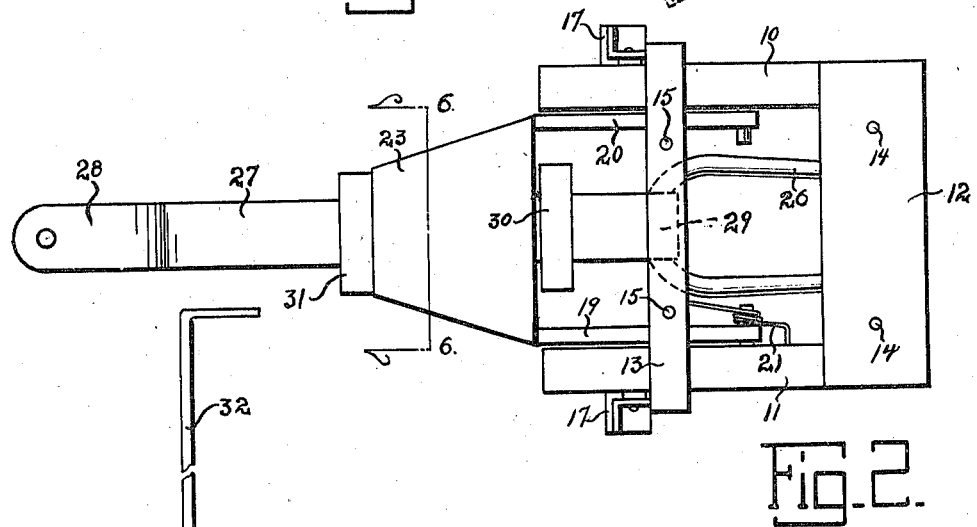
Fig. 2 is a top plan view of my hitch ready for use and more fully illustrating its structure.
Figure 3:
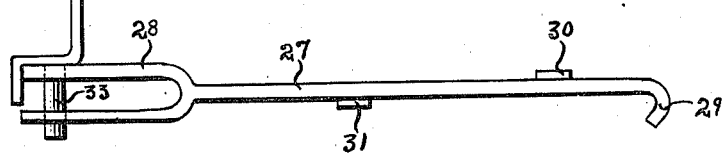
Fig. 3 is a side elevational view of the drawing arm of my hitch showing the method of inserting the controlling handle therein for facilitating the movement of this arm.

There are great many types of connecting hitches, draw bars and the like now in common use. Such hitches are successful if the pulling vehicle is readily movable and the trailing or pulled vehicle is comparatively light in weight. However, in many situations, it is impossible for one man to connect or disconnect the drawn vehicle to or from the drawing vehicle and if when maneuvering the tractor or like pulling vehicle exact alignment is not obtained. It is very difficult indeed to account for any misjudgment of distance between the pulling vehicle and the trailing vehicle or implement. Most tractors or the like have a draw bar which has holes cut therethrough and spaced at intervals and is usually connected to a farm implement by a king bolt, clevis or the like. It is difficult to position a tractor with such accuracy that a connection between the tractor and the implement to be pulled can readily be made because, unless the draw bar of the tractor and the tongue of the vehicle are by coincidence in exactly the same plane a cramping action will take place making it very difficult to insert or remove pins holding the clevis on to the draw bar of the tractor. With such connections, it is obvious that there is no flexibility in the hitch proper and as is often the case two or more men are needed to help connect a tractor to an implement. I have overcome such objections by providing a strong hitch that is flexible facilitating the attachment or detachment of an implement to or from a tractor but which will be of rigid structure when in use as a connecting link between the pulling vehicle and the pulled vehicle. Referring to the drawings I have used the numerals 10 and 11 to designate two spaced apart parallel angle irons or the like. The numeral 12 indicates a tie plate rigidly secured to the angle irons 10 and 11 by welding or the like for holding them in spaced rigid relationship. The numeral 13 indicates a cross arm rigidly secured adjacent its end portions to the angle irons 10 and 11 as shown in Fig. 2 of the drawings but projecting beyond the angle irons 10 and 11 as shown. The numerals 14 and 15 indicate holes cut through the plate 12 and the cross arm 13 for the purpose of permitting the attachment of the tongue of an implement. This tongue is indicated by dotted lines in Fig. 1 and designated by the numeral 16. I have used the numeral 17 to designate a brace stand having its upper end portions rigidly secured to the side arms or angle irons 10 and 11 and capable of swinging downwardly for supporting the tongue portion 16 of the trailing vehicle or implement when the implement is not in use. This stand 17 hangs upwardly and rearwardly out of the way when the implement is being pulled by a tractor or like. When the stand is in a vertical position and supporting the tongue portion of the implement the upper end portions of the stand 17 contact the projecting ends of the tie bar or like 13 preventing the rotation of the stand beyond its vertical axis. I have used the numeral 18 to designate a yoke member having the two side arms 19 and 20 as shown in the drawings. The end portions of these side arms 19 and 20 are secured to the angle irons 10 and 11 and the yoke 18 is held in alignment with the angle irons 10 and 11 by the tension spring 21. It will be here noted that holes are provided in the angle irons 10 and 11 and in the side arms 19 and 20 of the yoke 18 so that bolts or the like may be placed through the arm and the angle irons as shown by dotted lines in Fig. 5. These bolts I have designated by the numerals 22. At times it is desired that the yoke portion 18 and the angle irons 10 be rigidly secured together and it is for this purpose that I have provided the means comprising the bolts 22 for attaining this rigidity at times. The numeral 23 designates a plate secured over and forming a part of the yoke member 18 and providing a channel 24, upon its lower portion as shown in the drawings. I have used the numeral 25 to designate a U-bolt or the like rigidly secured to the lower side of the plate 12 as shown in Figs. 4 and 5 of the drawings. The numeral 26 designates a link having one end loosely resting in and supported by the U-bolt 25. The numeral 27 designates a drawing arm having the usual forked clevises 28 formed on one of its end portions and which in normal use is secured to the draw bar of the tractor. The numeral 29 indicates a hook formed on the other end of the arm 27 for engaging the link 26 at times. I have used the numeral 30 to indicate a bar stop rigidly secured to the upper side of the arm 27 and engaging the rearward portion of the yoke member 18 adjacent the channel groove 24 as shown in the drawings. Similarly, the numeral 31 indicates a stop member rigidly secured to the arm 27 on its lower side, spaced apart from the bar or stop 30 and capable of engaging the forward end portion of the yoke 18 adjacent the channel 24 therein. Thus when the hitch is in an operative position the bars 30 and 31 contact the frame of the yoke 18 at either end of the channel 24. I have used the numeral 32 to indicate a manually operated controlling handle having in its lower end portion a pin 33 for permitting the operator of the tractor to maneuver the hook member 29 into engagement with the link 26 for engaging or disengaging the tractor to or from the pulled vehicle. I have used the numeral 34 to indicate a stop bar brace secured at either of its ends to the angle irons 10 and 11 and which serves as a stop for preventing a link 26 from swinging beyond a given point.

The practical operation and use of my device is as follows:

The plates 12 and 13 are secured to the under side of the tongue of an implement which carries the entire hitch assembly. When the implement is at rest the tongue 16 is supported by the stand 17 in a manner similar to that shown in Fig. 1 of the drawings. When it is desired to attach the tractor to the hitch the forked portion 28 may either be secured to the tractor or may be maneuvered by the use of the handle member 32 until the hook portion 29 of the draw arm 27 engages the link 26 which will be in the approximate position shown in Fig. 1. Then as the tractor moves forward the tongue 16 and the major portion of the hitch will be pulled forwardly and will tend to drop toward the level of the tractor attachment as indicated by dotted lines in Fig. 1 until the stand 17 no longer supports the tongue 16. The stand may be held upwardly and rearwardly by any suitable means and the draw arm 27 will drop into the channel groove 24 formed by the yoke 18 and in this position the stops 30 and 31 will be on either side of the frame 18 adjacent the channel groove as shown in the drawings. When it is desired to place the implement back on the stand and disengage it from the tractor, the tractor is merely backed up, the stand released, and the stop 31 engaging the forward end portion of the yoke 18 will push rearwardly on the yoke causing it to pivot against the tension of the spring 21, permitting the tongue and hitch to raise until it is supported by the stand 17. At this point pressure will be released between the stop 31 and the end of the yoke 18 and the yoke 18 will spring back to its normal position by virtue of the tension of the spring 21. Should it be desired to make rigid assembly with those implements having the same approximate operating height as the tractor draw bar and under certain conditions the bolts 22 are placed through the channels 10 and 11 and the arms 19 and 20 so that the tractor and implement may be backed up at any time without forcing the device onto the stand or without causing a disengagement of the draw arm 27 and hook 29 with the frame 18 or link 26 respectively.

In order to facilitate the connection of the draw arm 27 with the link 26 the handle member 32 may be used and the pin 32 introduced into the holes in the forked portion 28 and the driver of the vehicle may then maneuver the hook into position so that it will engage the link 26. The forward end portion or fork 28 may then be placed in position so that it can engage the draw bar of the tractor. Thus my hitch is flexible permitting the attachment of an implement to a tractor even when the tractor and implement are decidedly out of line and will pull into a locked or drawing position without any attention on the part of the driver.

Thus it will be seen that I have provided a hitch which fulfills all of my objects that is extremely flexible in its utility, versatile in its uses, of great strength and which presents many more obvious advantages. Obviously the frame member comprising the angle irons 10 and 11, the plates 12 and 13 and the stop 34 may be constructed in one piece and many variations and adaptations are apparent in the structure and operation of my hitch permitting it to accomplish the same result.

Some changes may be made in the construction and arrangement of my improved hitch without department from the real spirit and purpose of my invention, and it is my intention to cover by my claims any modified forms of structure or use of mechanical equivalents which may be reasonably included within their scope.

I claim:

1. In a device of the class described, a frame member designed to be operatively secured to a vehicle, a yoke element pivotally secured to said frame and having a channel groove in its forward end portion, a link member loosely secured to said frame member, a draw arm designed to have one of its end portions pivotally engage said link at times, and stop bars rigidly secured to said draw arm for engaging said yoke portion adjacent either end of said channel groove therein at times.

2. In a device of the class described, a frame member designed to be operatively secured to a vehicle, a yoke element pivotally secured to said frame and having a channel groove in its forward end portion, means for holding said yoke adjacent said frame at times, a link member loosely secured to said frame member, a draw arm designed to have one of its end portions pivotally engage said link at times, and stop bars rigidly secured to said draw arm for engaging said yoke portion adjacent either end of said channel groove therein at times.

3. In a device of the class described, a frame member designed to be secured to the tongue portion of a vehicle, a yoke member pivotally secured to said frame and having a receiving channel groove therein, means for yieldingly holding said yoke member in one of its positions, a link element pivotally secured to said frame, a drawing arm having one of its ends capable of engagement with said link at times and its other end designed to engage a pulling vehicle, spaced apart stop bars on said drawing arm; said drawing arm capable of being received by the channel groove in said yoke so that said stop bars contact said yoke adjacent said channel groove when said drawing arm is in an operative position, and a stand pivotally secured to said frame member and capable of supporting said hitch at times.

4. In a device of the class described, a frame member designed to be secured to a vehicle, a yoke member rigidly secured to said frame member and having a channel groove in its lower forward end portion, a link element operatively secured to said frame member, and arm member having one end designed to operatively engage said link element at times and its other end designed to be secured to a pulling vehicle, and means secured to said arm for engaging said yoke and holding said arm within said channel groove in said yoke and in alignment with said frame at times.

5. In a device of the class described, a frame member designed to be rigidly secured to a vehicular implement, a yoke member secured to said frame member and having a receiving channel groove therein, means for yieldingly holding said yoke member in one of its positions, a link element pivotally secured to said frame, a drawing arm having one of its ends capable of engagement with said link at times and its other end designed to engage a pulling vehicle, spaced apart stop bars on said drawing arm; said drawing arm capable of being received by the channel groove in said yoke so that said stop bars contact said yoke adjacent said channel groove when said drawing arm is in an operative position, a stand pivotally secured to the sides of said frame member capable of supporting said hitch at times, a bar on said frame member for limiting the swinging action of said stand in one direction.

6. In a device of the class described, a frame member designed to be operatively secured to a vehicle, a yoke-pivoted element secured to said frame having therein a channel groove, a link member secured to said frame member, a draw arm capable of engaging said link at times, stop bars on said arm for engaging said yoke portion at either end of said channel groove at times.

OTTO F. JAGER.